(12) United States Patent
Then-Gautier

(10) Patent No.: US 11,485,235 B2
(45) Date of Patent: Nov. 1, 2022

(54) MODULE ACTIVE RESPONSE SYSTEM

(71) Applicant: Ecolution kWh, LLC, Naples, FL (US)

(72) Inventor: Johnny Then-Gautier, Santo Domingo (DO)

(73) Assignee: ECOLUTION KWH, LLC, Naples, FL (US)

( * ) Notice: Subject to any disclaimer, the term of this patent is extended or adjusted under 35 U.S.C. 154(b) by 353 days.

(21) Appl. No.: 16/871,281

(22) Filed: May 11, 2020

(65) Prior Publication Data

US 2020/0282838 A1 Sep. 10, 2020

Related U.S. Application Data

(63) Continuation of application No. 15/858,848, filed on Dec. 29, 2017, now Pat. No. 10,668,814.

(60) Provisional application No. 62/440,775, filed on Dec. 30, 2016.

(51) Int. Cl.
*B60L 7/10* (2006.01)
*F16D 55/226* (2006.01)
*H02K 7/102* (2006.01)

(52) U.S. Cl.
CPC .............. *B60L 7/10* (2013.01); *F16D 55/226* (2013.01); *H02K 7/102* (2013.01); *B60L 2220/44* (2013.01)

(58) Field of Classification Search
CPC ...... B60L 7/10; B60L 2220/44; F16D 55/226; H02K 7/102
See application file for complete search history.

(56) References Cited

U.S. PATENT DOCUMENTS

| 10,668,814 | B1 | 6/2020 | Then-Gautier |
| 2010/0282122 | A1 | 11/2010 | Mai |
| 2012/0091724 | A1* | 4/2012 | Bodenstein ........ H02K 15/0006 290/55 |
| 2013/0093189 | A1 | 4/2013 | Lim |
| 2013/0147441 | A1 | 6/2013 | Lee |
| 2013/0154363 | A1 | 6/2013 | Lim |
| 2013/0167752 | A1 | 7/2013 | Barbee |
| 2014/0188699 | A1 | 7/2014 | Langgood et al. |
| 2016/0236658 | A1 | 8/2016 | Rozza |
| 2017/0349039 | A1 | 12/2017 | Rayner |
| 2018/0086355 | A1 | 3/2018 | Pyper |
| 2018/0093655 | A1 | 4/2018 | Healy et al. |
| 2019/0003534 | A1 | 1/2019 | Rodriguez |
| 2019/0011000 | A1* | 1/2019 | Welin ................. F16D 55/2255 |

FOREIGN PATENT DOCUMENTS

| CN | 202463594 U | 10/2012 |
| CN | 204383196 U | 6/2015 |
| WO | 2020069737 A1 | 4/2020 |

* cited by examiner

*Primary Examiner* — Nicholas Kiswanto
(74) *Attorney, Agent, or Firm* — Patzik, Frank & Samotny Ltd.

(57) ABSTRACT

The invention relates to the supplemental generation of energy from a vehicle operation, and specifically to the generation of energy in connection to a vehicle's disc brakes in combination with brushless electric motor-generators. The aim of the invention is to provide a solution making it possible to provide a generator and a disc brake having a compact structure.

19 Claims, 16 Drawing Sheets

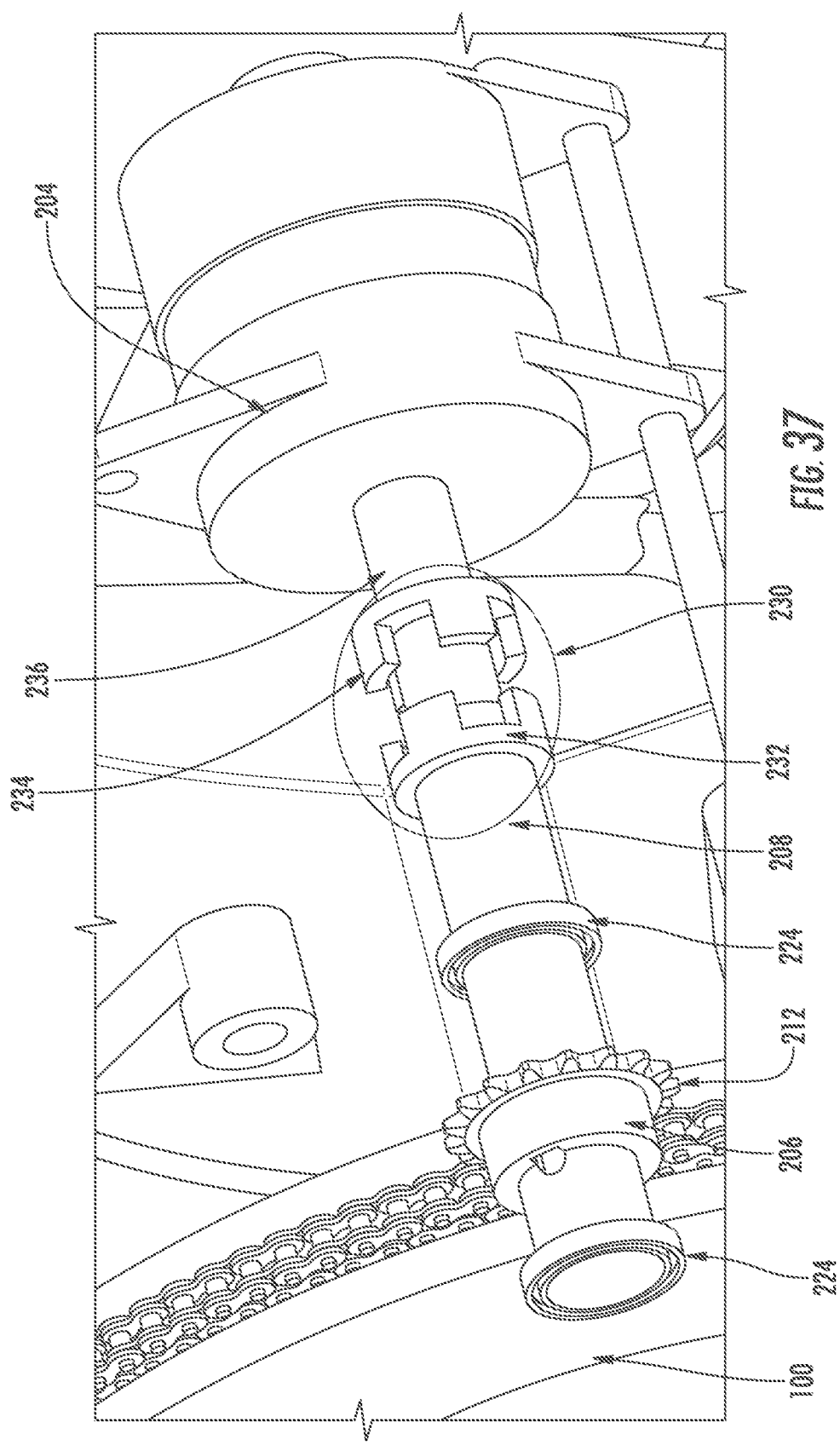

MODULE ACTIVE RESPONSE SYSTEM

CROSS-REFERENCE TO RELATED APPLICATIONS

This application is a Continuation of pending U.S. Non-Provisional patent application Ser. No. 15/858,848 titled "Module Active Response System", filed on Dec. 29, 2017, which claims benefit to U.S. Provisional patent application Ser. No. 62/440,775 titled "Module Active Response System", filed on Dec. 30, 2017, the disclosure of both which are herein incorporated by reference in their entirety.

PATENTS CITED

The following documents and references are incorporated by reference in their entirety, Erlston et al (U.S. Pat. Appl. No. 2008/0078631) and Bodenstein et al (U.S. Pat. Appl. No. 2012/0091724).

FIELD OF THE INVENTION

The present invention relates to the supplemental generation of energy from a vehicle operation, and specifically to the generation of energy from vehicle disc brakes in combination with brushless electric motor-generators.

DESCRIPTION OF THE RELATED ART

A vehicle's motion requires a large amount of energy to be accomplished, and an almost equal amount of energy (minus transmission losses) is released when the vehicle is stopped. In recent times, hybrid and other vehicles have used the electric motors located at the wheels to regenerate energy when braking is applied. In the same way, some of the energy spent to make the vehicle move can be recuperated.

Vehicles equipped with disc brakes (e.g., automotive, rail vehicle, light aircraft and other similar applications) employ a rotor located on the axle or wheel hub and a caliper mechanism that clamps brake pads against both sides of the rotor, creating friction and generating braking force. In most commercial and military aircraft, multiple rotors are connected, with ventilating slots between them. In conventional disc brake usage, a vehicle's kinetic energy is dissipated as heat when the brakes are applied.

The ability to generate electricity from such braking motion would be advantageous in that a battery would be charged, therefore obviating the need for the vehicle alternator to operate. What is required is a simple mechanical way in which to couple to said brake rotors.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a vehicle energy apparatus comprising a generator coupled to a shaft, said shaft having mechanical components for coupling with a disc ventilating slot and electronic components for connecting said generator to a vehicle's electrical system.

Other features and advantages of the present invention will become apparent upon examining the following detailed description of an embodiment thereof, taken in conjunction with the attached drawings.

BRIEF DESCRIPTION OF THE DRAWINGS

FIG. 37 is a partial perspective view of a coupler engaging a chain around the disc brake rotor and showing a clutch, according to an exemplary embodiment of the invention.

Figure 1:
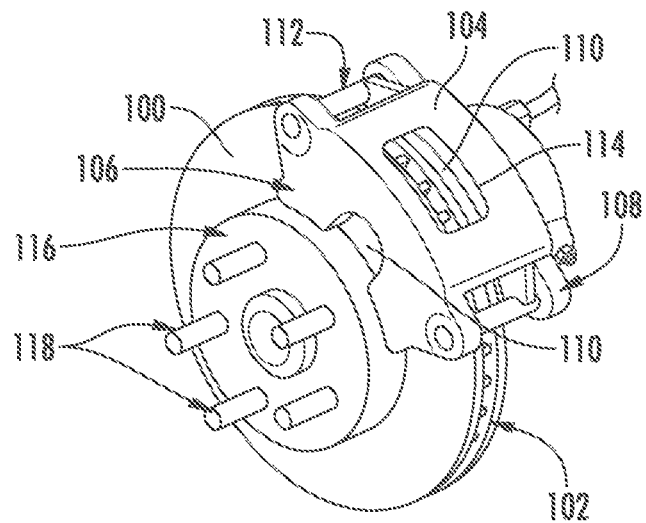
FIG. 1 is a front perspective view showing the components of a disc brake system, according to the prior art.
Figure 2:
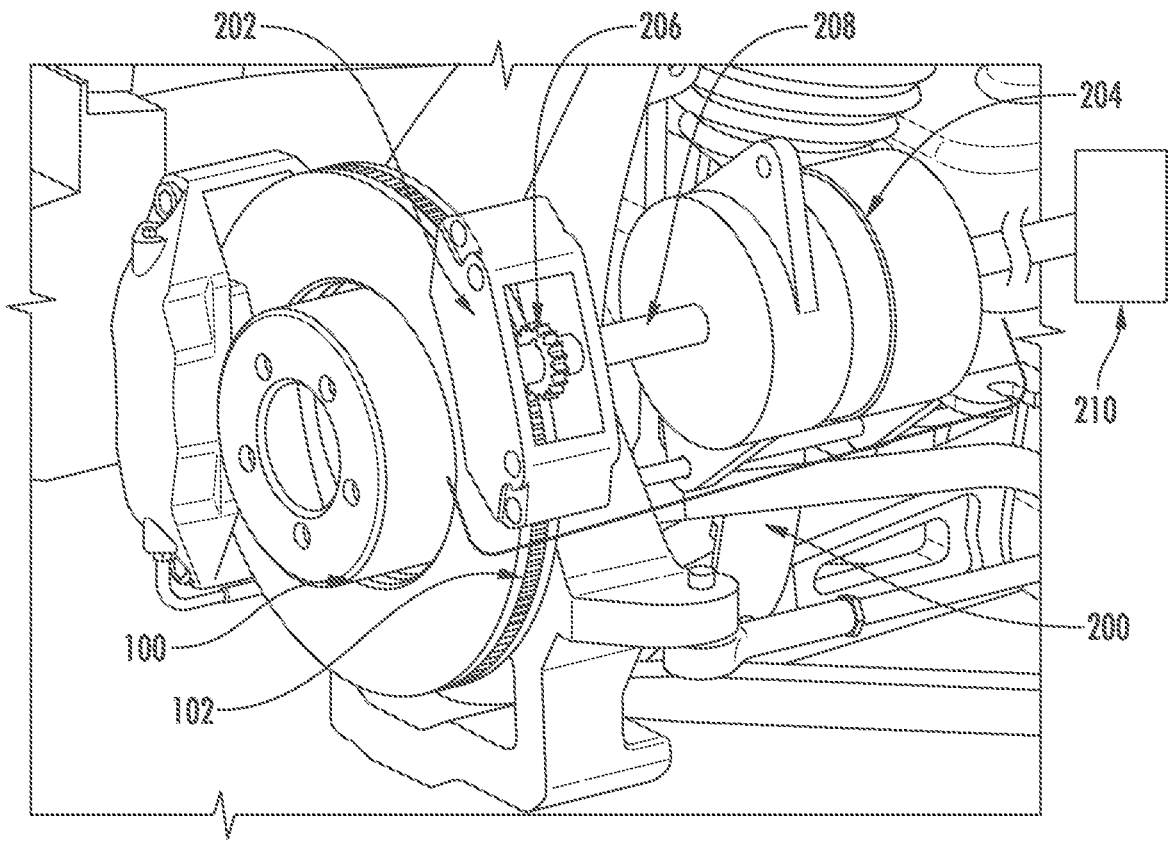
FIG. 2 is a perspective view of a coupled disc brake and generator, according to an exemplary embodiment of the invention.
Figure 3:
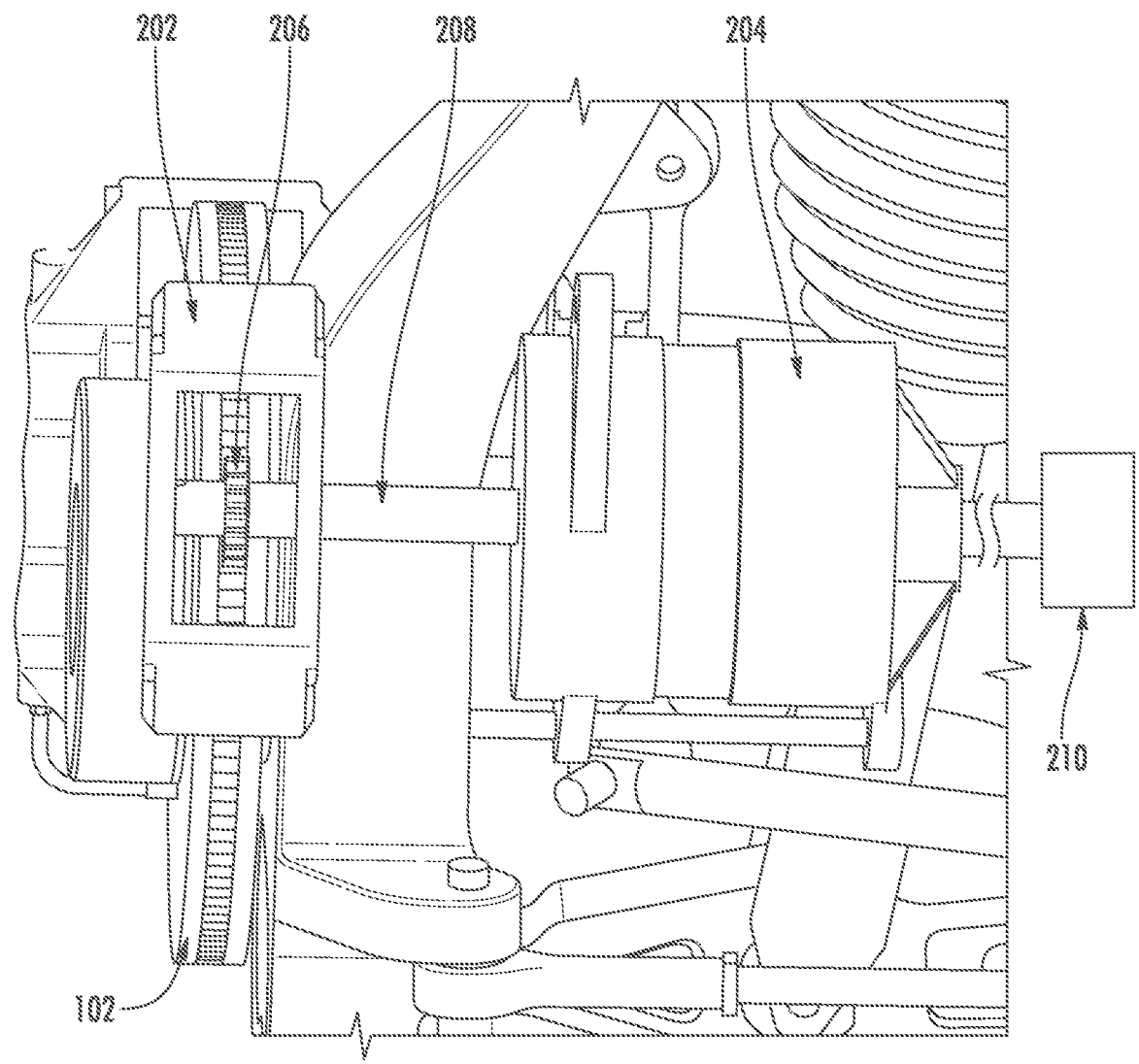
FIG. 3 is a rear view of a coupled disc brake and generator, according to an exemplary embodiment of the invention.
Figure 4:
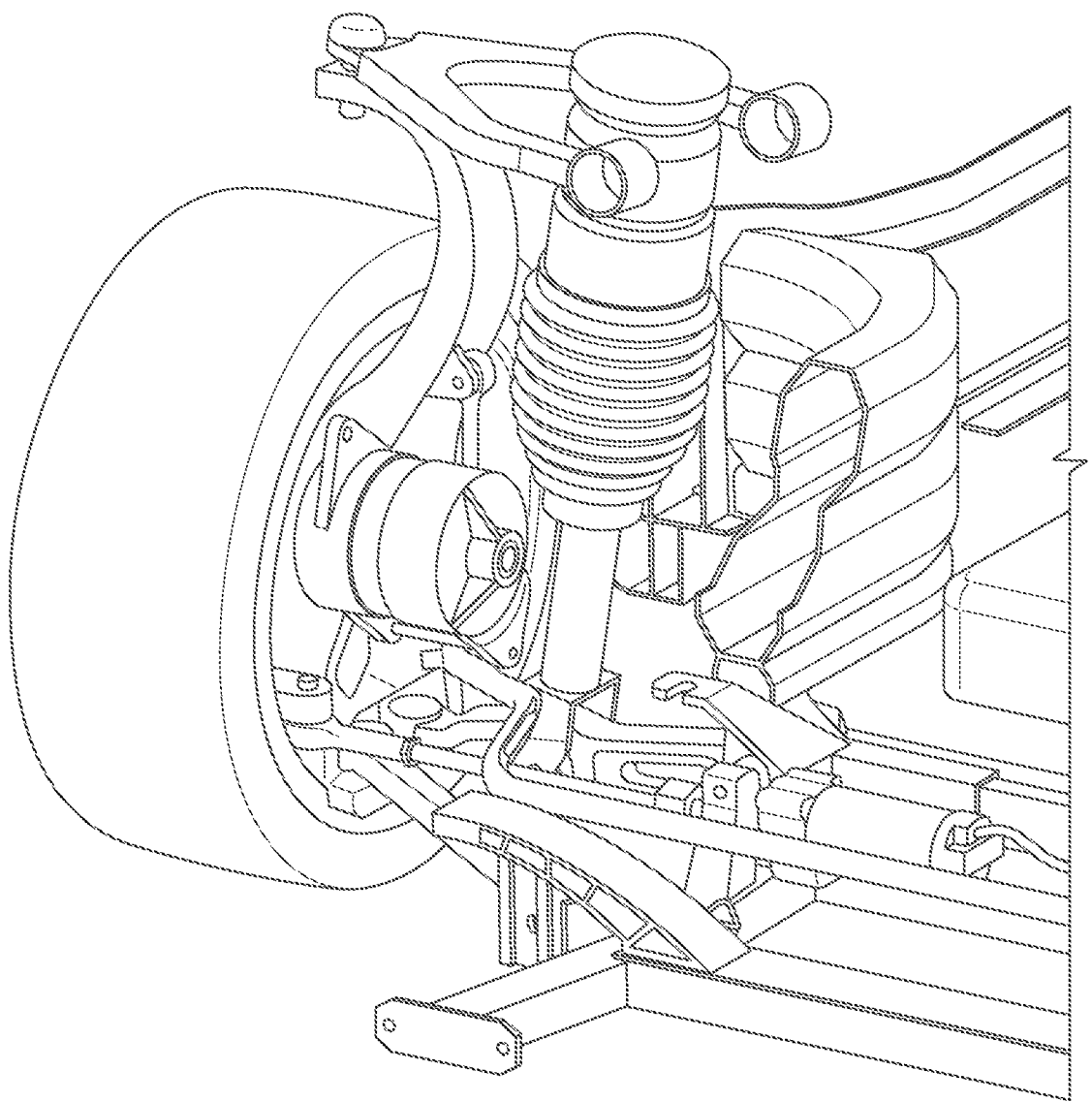
FIG. 4 is a perspective view of a coupled disc brake and generator including a vehicle tire, according to an exemplary embodiment of the invention.
Figure 5:
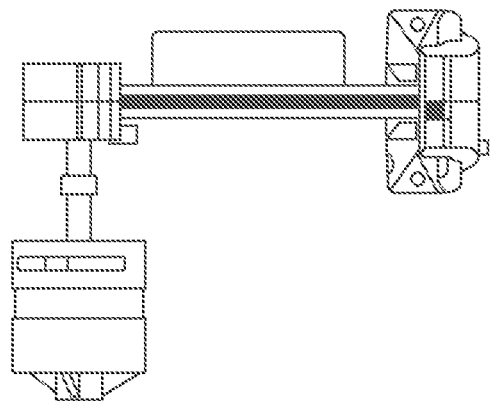
FIGS. 5 and 6 are top views of the coupled disc brake and generator, according to exemplary embodiments of the invention.
Figure 6:
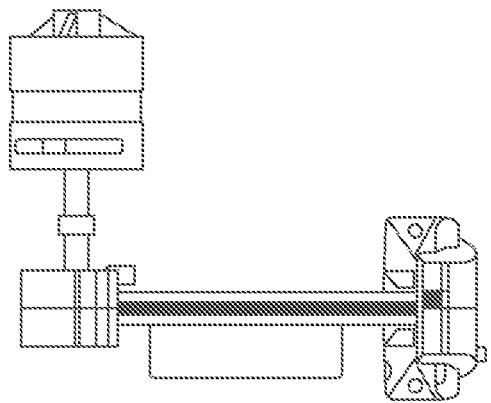
Figure 7:
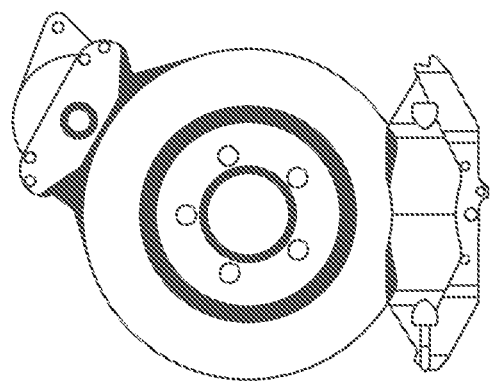
FIGS. 7 and 8 are side views of the disc brake and bracket, according to exemplary embodiments of the invention.
Figure 8:
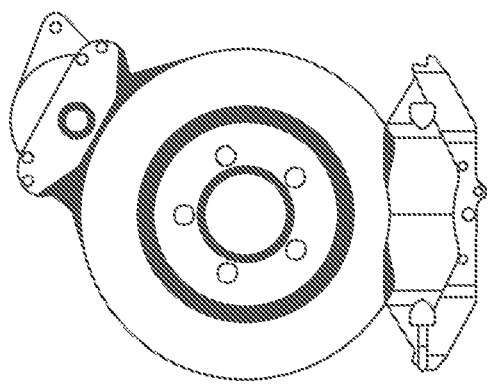
Figure 9:
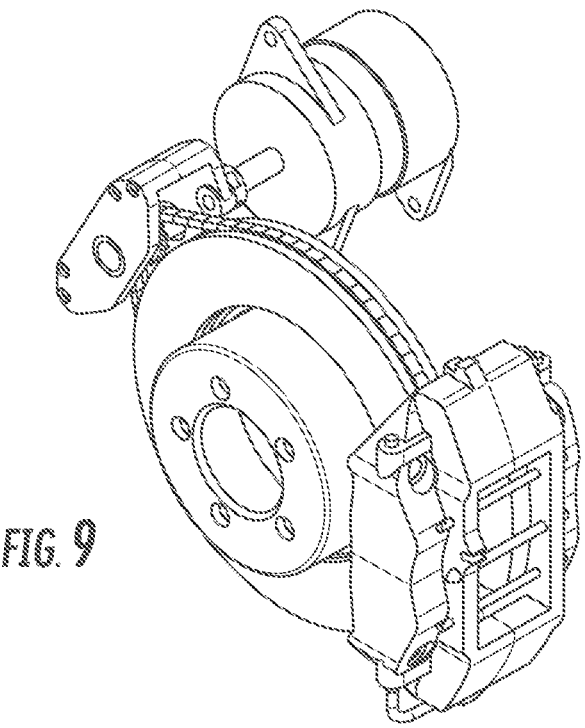
FIGS. 9 and 10 are perspective views of the disc brake and generator components, according to exemplary embodiments of the invention.
Figure 10:
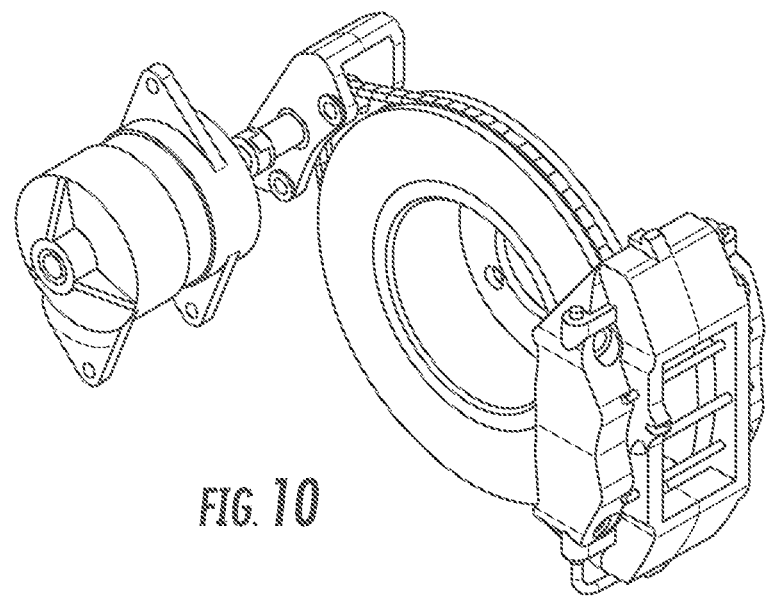
Figure 12:
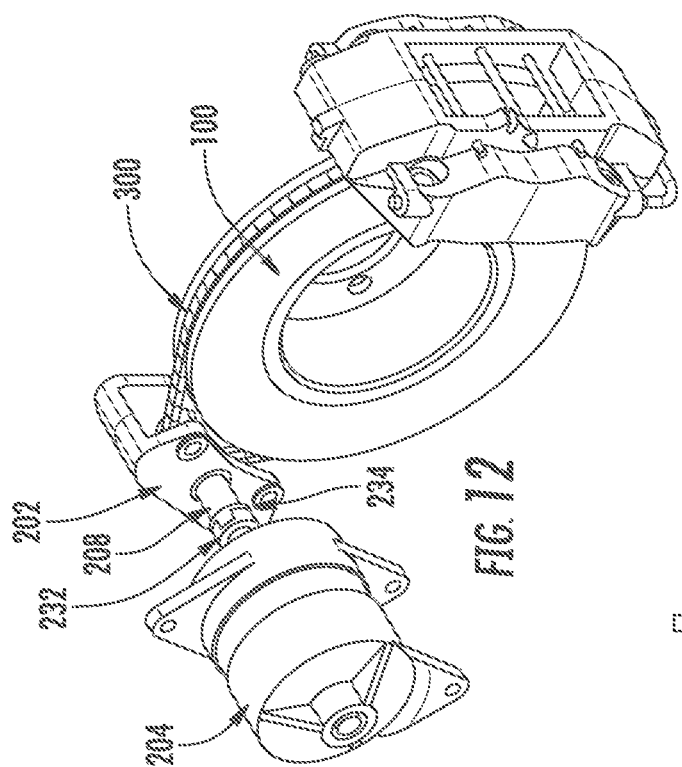
FIG. 12 is a perspective view of a chained and coupled disc brake and generator, according to an exemplary embodiment of the invention.
Figure 13:
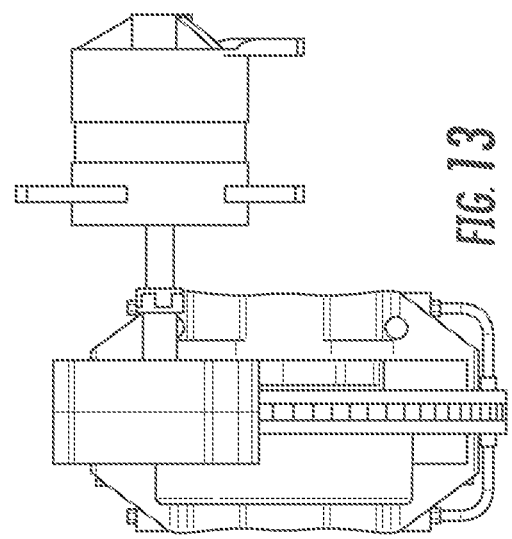
FIG. 13 is a front view of a chained and coupled disc brake and generator, according to an exemplary embodiment of the invention.
Figure 11:
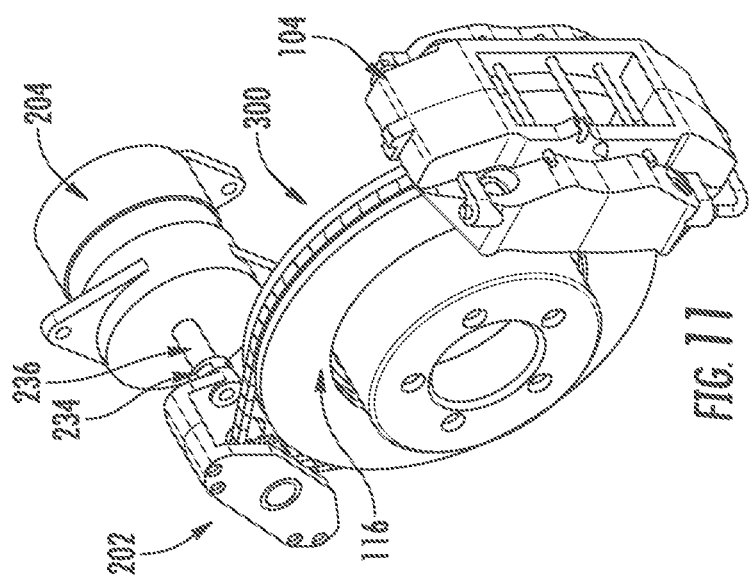
FIG. 11 is a perspective view of a chained and coupled disc brake and generator including the wheel hub, according to an exemplary embodiment of the invention.

The above-described and other features will be appreciated and understood by those skilled in the art from the following detailed description, drawings, and appended claims.

DETAILED DESCRIPTION OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1, a disc brake system as presently embodied in the prior art is shown with a disc or disk brake rotor 100 that has ventilating slots 102 circumferentially positioned about the center of the disc or disk brake rotor 100. A brake caliper 104 having a hollow interior defined by a pair of side portions 106, 108 is positioned astride of the disc brake rotor 100. Positioned within the hollow interior on the inside of the side portions 106, 108 are a pair of brake pads 110 sized to engage a portion of the outer surfaces of the disc brake rotor 100. A guide pin 112 located at one end of the brake caliper 104 allows the brake caliper 104 to be squeezed, thereby moving the brake pads 110 into engagement with the disc brake rotor 100. An inspection hole 114 on the top of the brake caliper 104 allows for the brake pads 110 to be viewed to determine their relative wear. The disc brake rotor 110 is connected to the wheels through the wheel hub 116 and wheel studs 118.

Referring to FIGS. 2-37, various embodiments of the energy generation system 200 are shown as having a generator 204, a mechanical coupler 206, a connecting member 208 and an energy storage system 210. In both front and rear wheel configurations the system 200 fits within the wheel area, with those in front being able to rotate with wheel movement.

Figure 19:
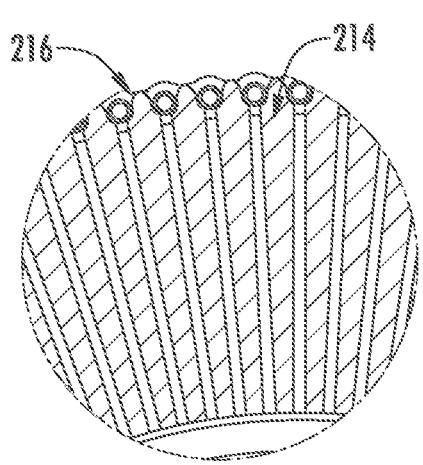
FIG. 19 is a partial sectional view of a disc brake coupled with a chain, according to an exemplary embodiment of the invention.

Referring to FIGS. 2-3, 21 and 29A-C, the mechanical coupler 206 is shown as a sprocket or gear having a plurality of teeth 212 spaced apart its circumference and sized and shaped to engage the corresponding ventilating slots 102 on the disc brake rotor 100. In an alternate embodiment (FIGS. 33-37), the coupler 206 engages openings in a roller chain 300 that is placed around the edge of the disc brake rotor 100, facilitating the rotation. Referring to FIG. 19, in order to facilitate the mechanical connection of the chain 300 to the disc brake rotor 100, the spokes or elongated members 214 forming the ventilating slots 102 have tapered ends 216 for engaging openings in the chain 300.

The mechanical coupler 206 is connected to a shaft or axle 208 through its center. In order to maintain the coupler 206 in position relative to the disc brake rotor 100, a bracket 202 may be used. Similar to the disc caliper 104 in operation, the bracket 202 remains parallel to the disc brake surface. In order to not interfere with the operation of the disc brake, the coupler 206 and bracket 202 are placed apart from the caliper 104 about the disc brake rotor 102.

Figure 16:
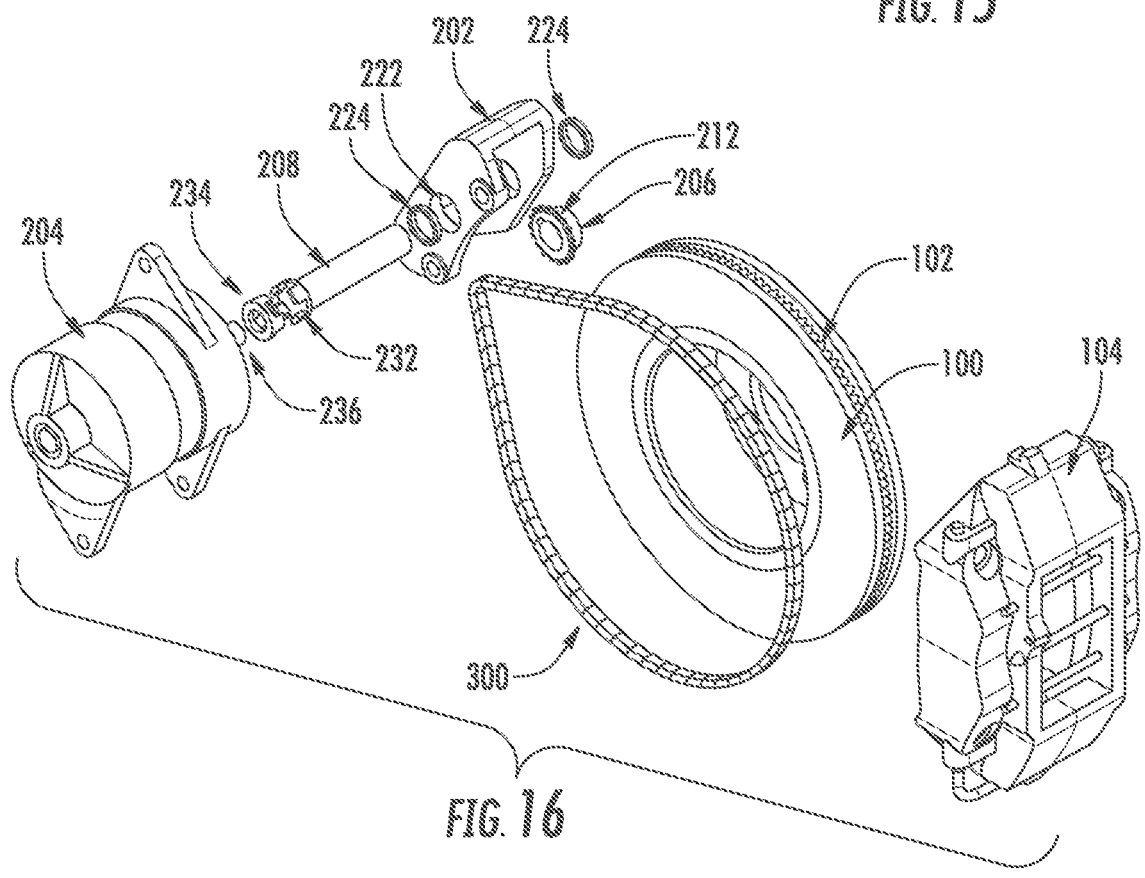
FIG. 16 is a partially exploded perspective view of a chained and coupled disc brake and generator, according to an exemplary embodiment of the invention.
Figure 17:
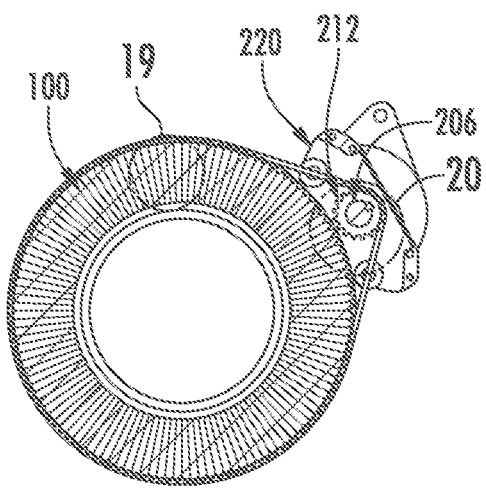
FIG. 17 is a sectional side view taken along the line B-B of FIG. 18 of a chained and coupled disc brake and generator, according to an exemplary embodiment of the invention.
Figure 18:
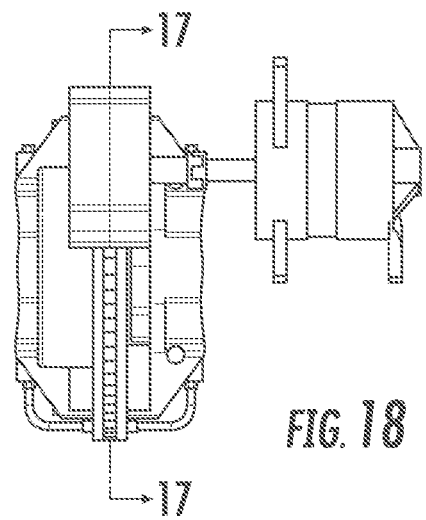
FIG. 18 is a front view of a chained and coupled disc brake and generator, according to an exemplary embodiment of the invention.

Referring again to FIG. 2, the bracket 202, having a hollow interior defined by pair of side walls 220, is positioned astride of the disc brake rotor 100. Opposing holes 222 extend through the side walls 220 for receiving a portion of the axle or shaft 208 therethrough to allow the coupler 206 to be aligned with the ventilating slots 102. As shown in FIG. 16, bushings 224 may be inserted into the holes 222 to facilitate rotation of the axle 208.

The axle 208 is connected to the generator 204 for generating energy in the form of either alternating current ("AC") or direct current ("DC"). The energy is then transmitted and/or stored in an energy storage component or system that may be locally positioned with the generator or is part of the vehicle's energy system. This may include feeding into the alternator/battery bus, and/or into a separate vehicle electronics circuitry.

Referring now to FIGS. 13, 23-24, 27-28 and 31-33, the energy generation system 200 may be equipped with a clutch 230 to only generate energy when desired or needed. The positive clutch 230 shown in the figures includes a jaw member 232 on the end of the axle 208 and a corresponding jaw member 234 positioned on a driven shaft 236 for the generator 204. When the clutch 230 is engaged, the corresponding jaw members 232, 234 are engaged to allow for the transmission of the rotational movement to the generator 204. When disengaged, the axle 208 will rotate without transmitting energy to the generator 204. Similarly, the generation of energy may be electronically shunted, so the load is minimal when not generating energy.

In operation, one or more teeth 212 from the sprocket 206 engage respective slots in the ventilating slots 102 of the disc brake rotor 100. As the disc brake rotor 100 is rotated, the sprocket 206 and axle 208 will also rotate as the teeth 212 of the sprocket 206 are moved out of and into engagement with the slots 102. Thus, as the wheel moves, the disc brake rotor 100 moves, and the axle 208 going to the generator moves thereby creating energy to be stored in the vehicle. If desired, the clutch 230 may be utilized to selectively permit control of the transmission of the energy to the generator 204.

Figure 14:
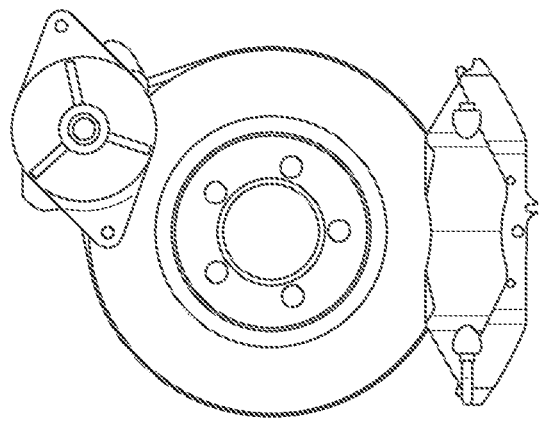
FIG. 14 is a side view of a chained and coupled disc brake and generator, according to an exemplary embodiment of the invention.
Figure 15:
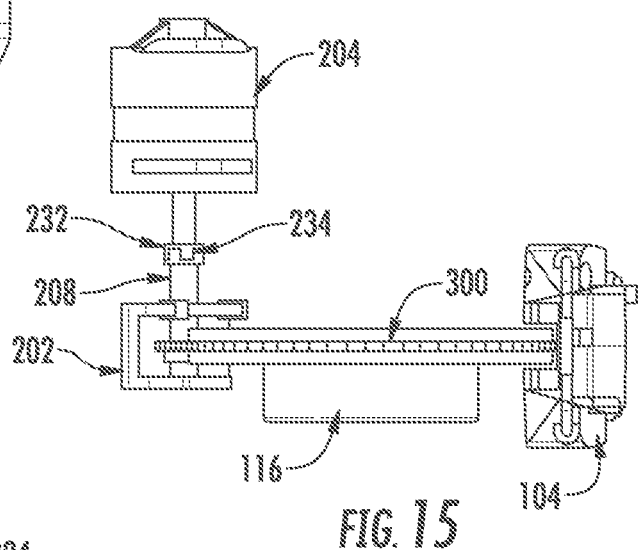
FIG. 15 is a top view of a chained and coupled disc brake and generator, according to an exemplary embodiment of the invention.
Figure 20:
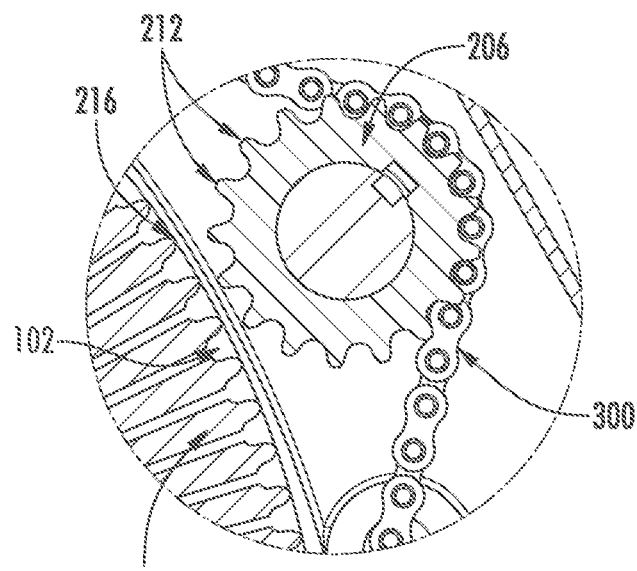
FIG. 20 is a partial sectional view of the sprocket coupled with the chain, according to an exemplary embodiment of the invention.
Figure 21:
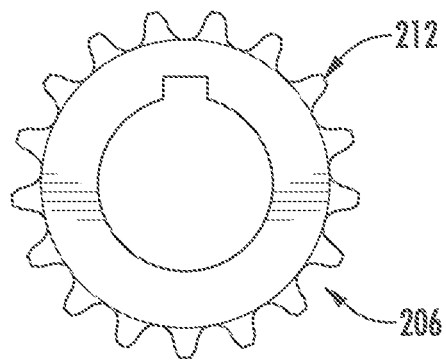
FIG. 21 is a top view of the sprocket, according to exemplary embodiments of the invention.
Figure 22:
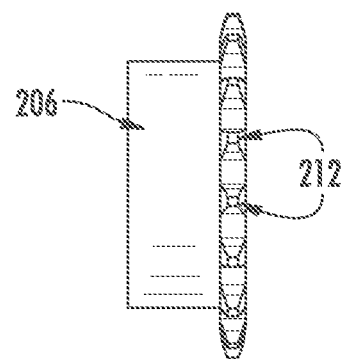
FIG. 22 is a side view of the sprocket, according to exemplary embodiments of the invention.
Figure 23:
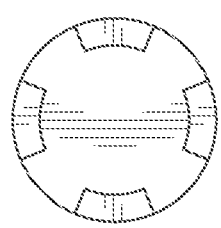
FIG. 23 is a top plan view of the axle and jaw member of the clutch.
Figure 24:
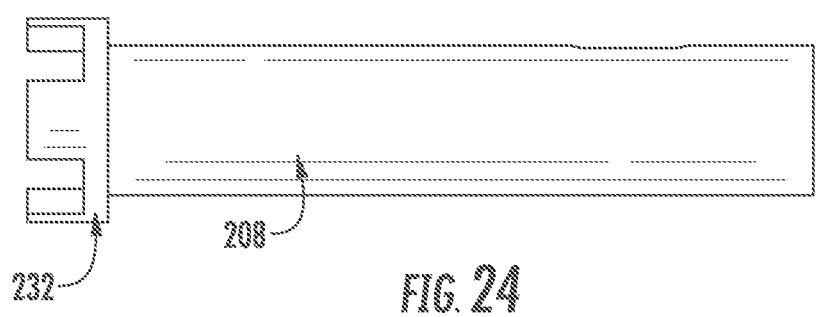
FIG. 24 is a side view of the axle and jaw member of the clutch.
Figure 25:
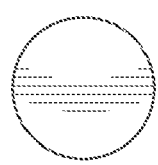
FIG. 25 is a top plan view of the generator shaft or driven member of the clutch.
Figure 26:
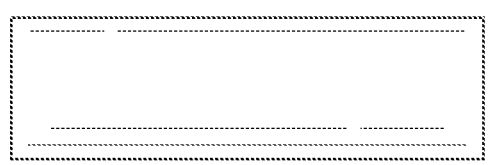
FIG. 26 is a side view of the generator shaft or driven member of the clutch.
Figure 27:
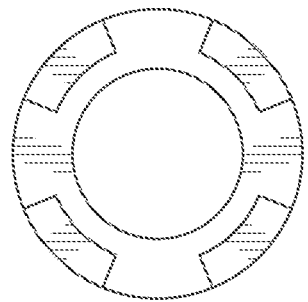
FIG. 27 is a top plan view of the jaw member of the clutch.
Figure 28:
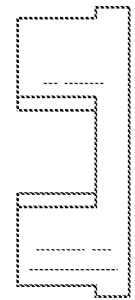
FIG. 28 is a side view of the jaw member of the clutch.
Figure 29A:
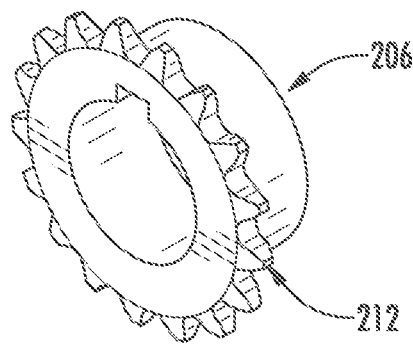
FIGS. 29A-29C show various views of the sprocket, according to exemplary embodiments of the invention.
Figure 29B:
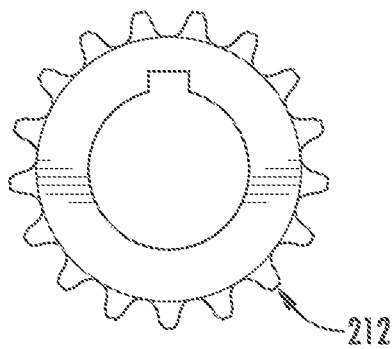
Figure 29C:
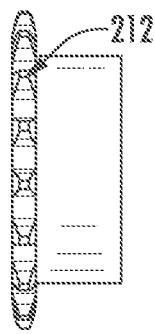
Figure 30A:
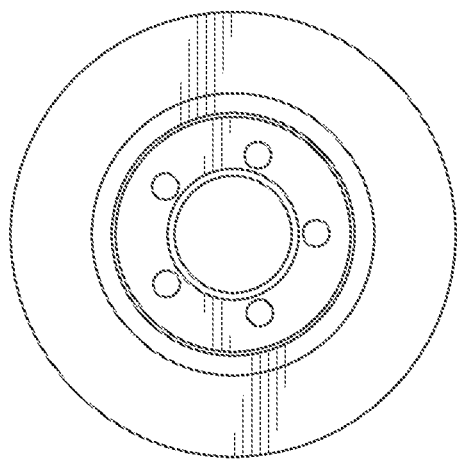
FIGS. 30A-30E show various views of the disk assembly components, according to exemplary embodiments of the invention.
Figure 30B:
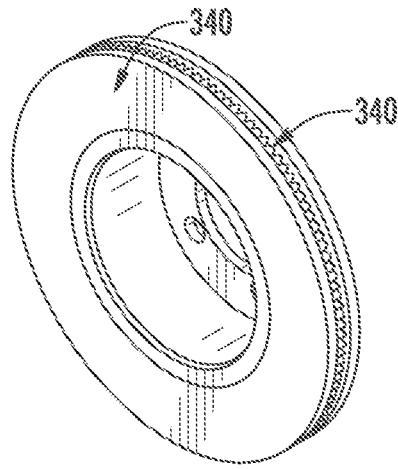
Figure 30C:
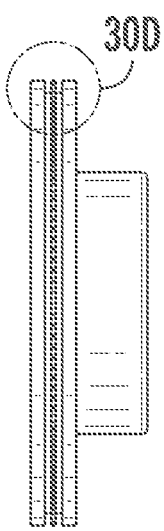
Figure 30D:
Figure 30E:
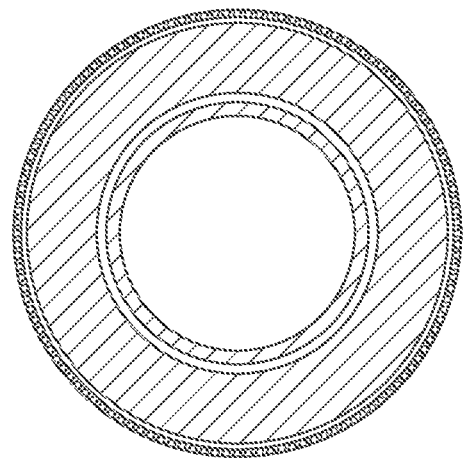
Figure 31:
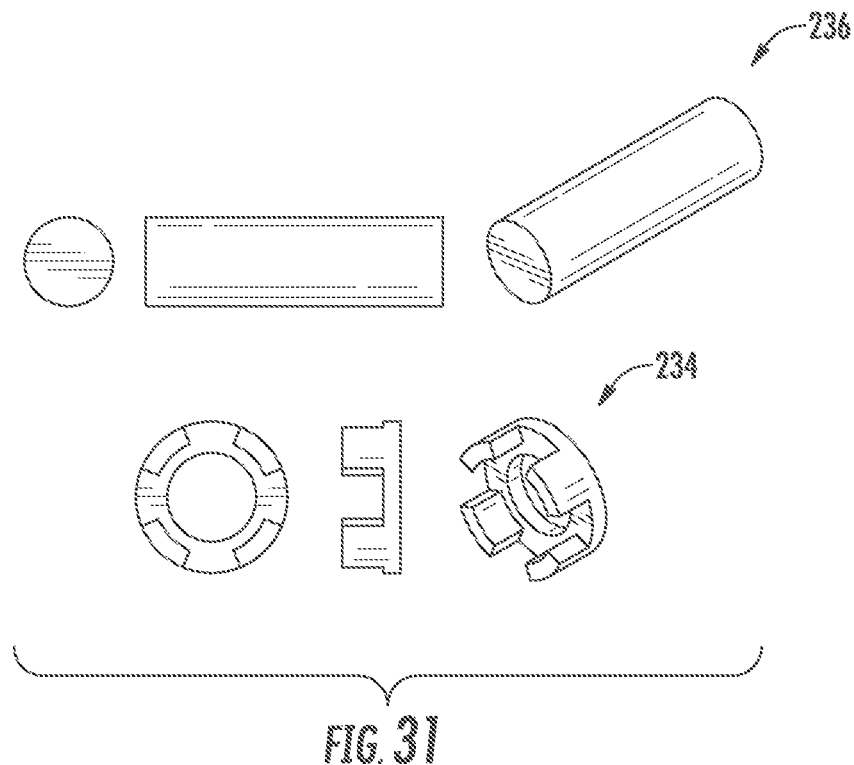
FIGS. 31-32 show various views of the axle and clutch, according to exemplary embodiments of the invention.
Figure 32:
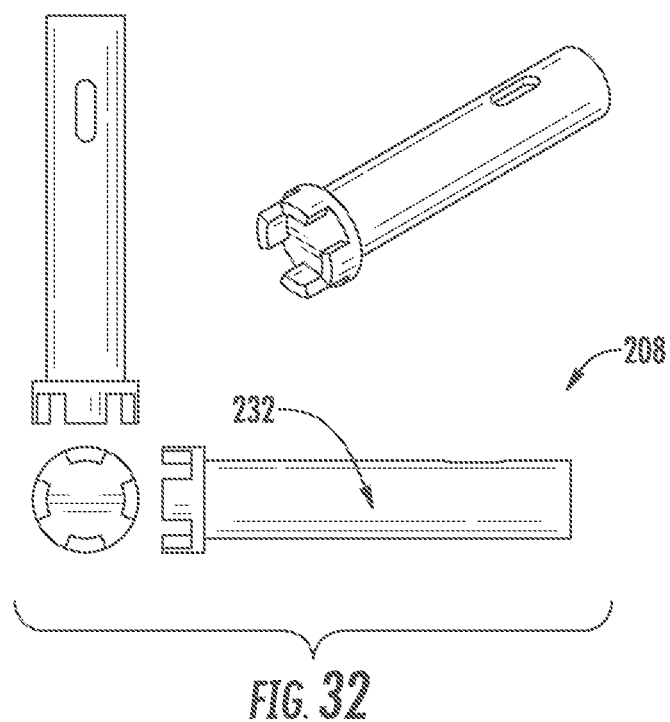
Figure 33:
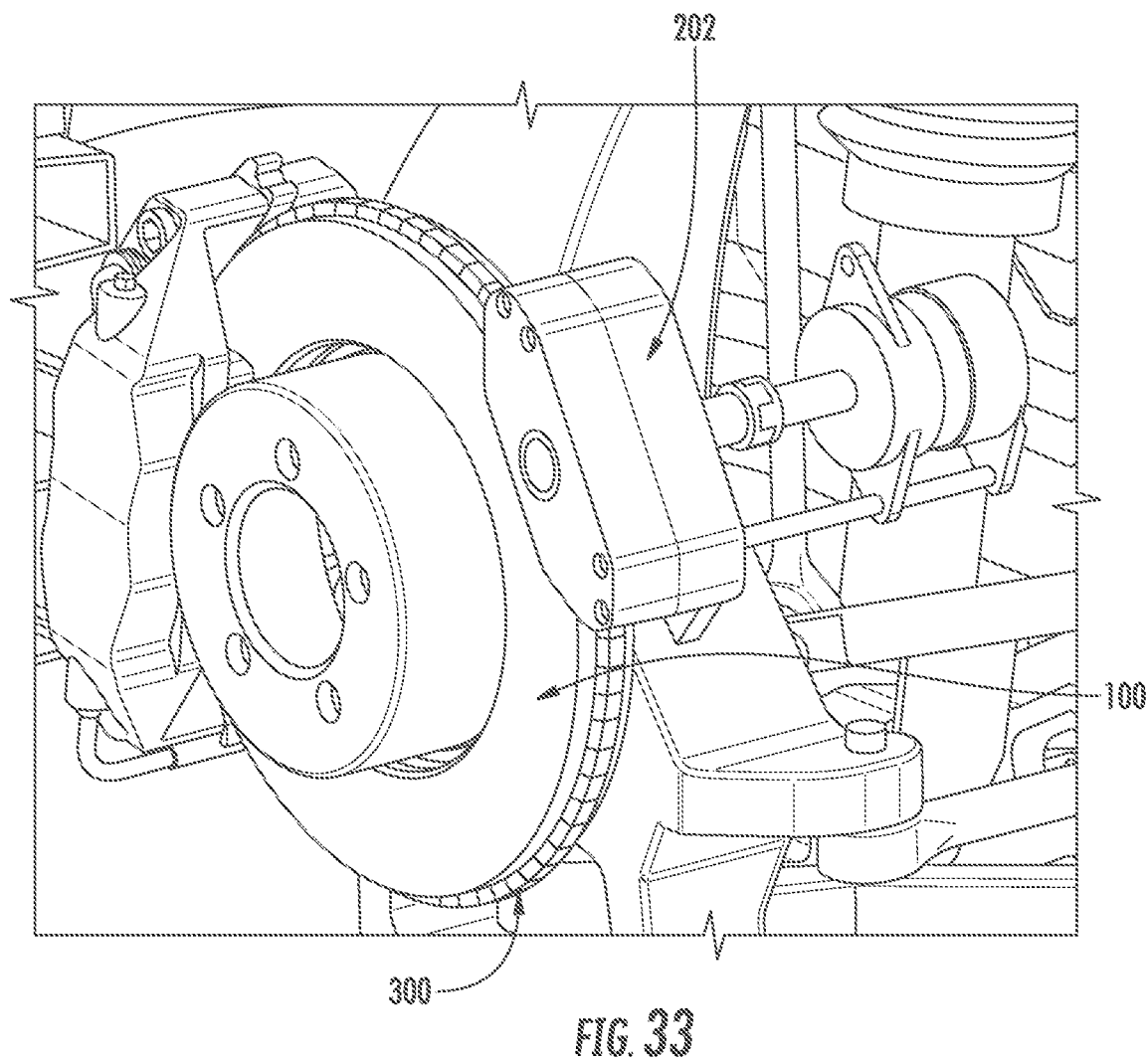
FIG. 33 is a perspective view of a coupled disc brake and generator, according to another exemplary embodiment of the invention.
Figure 34:
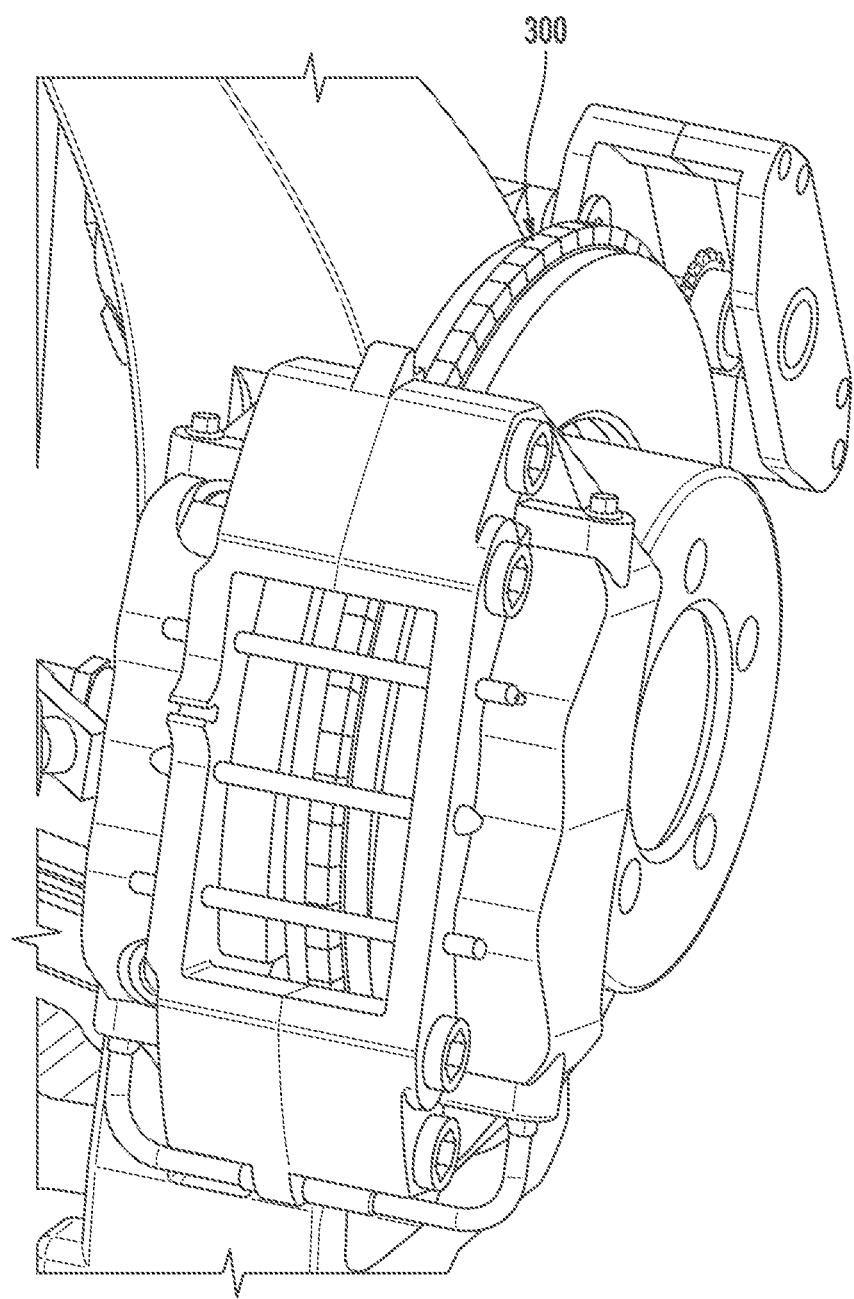
FIG. 34 is a front perspective view of a coupled disc brake and generator, according to another exemplary embodiment of the invention.
Figure 35:
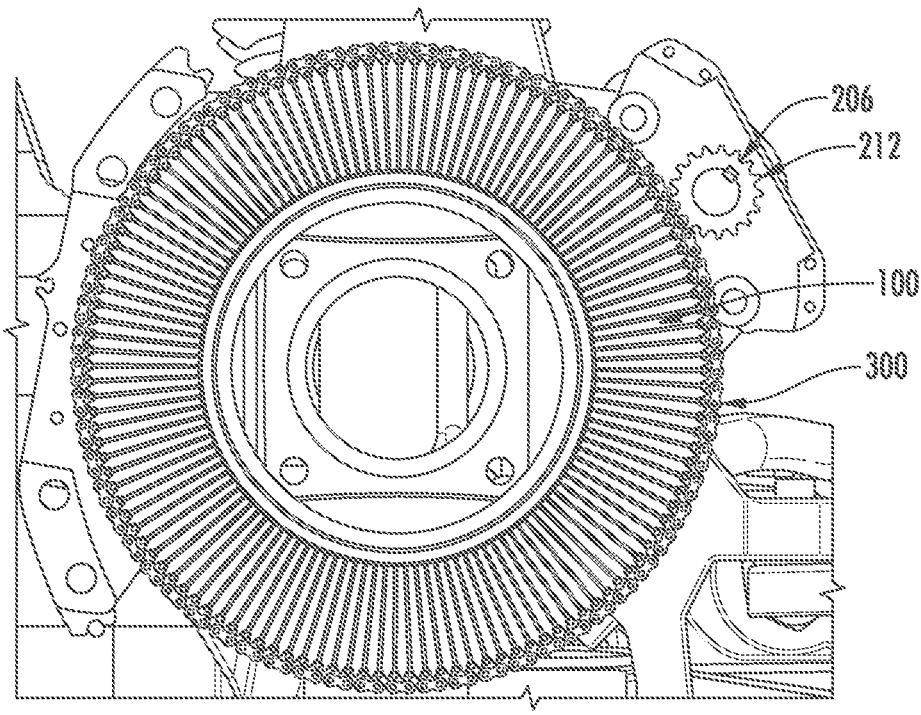
FIG. 35 is a cross-sectional side view of a coupled disc brake and generator, according to another exemplary embodiment of the invention.
Figure 36:
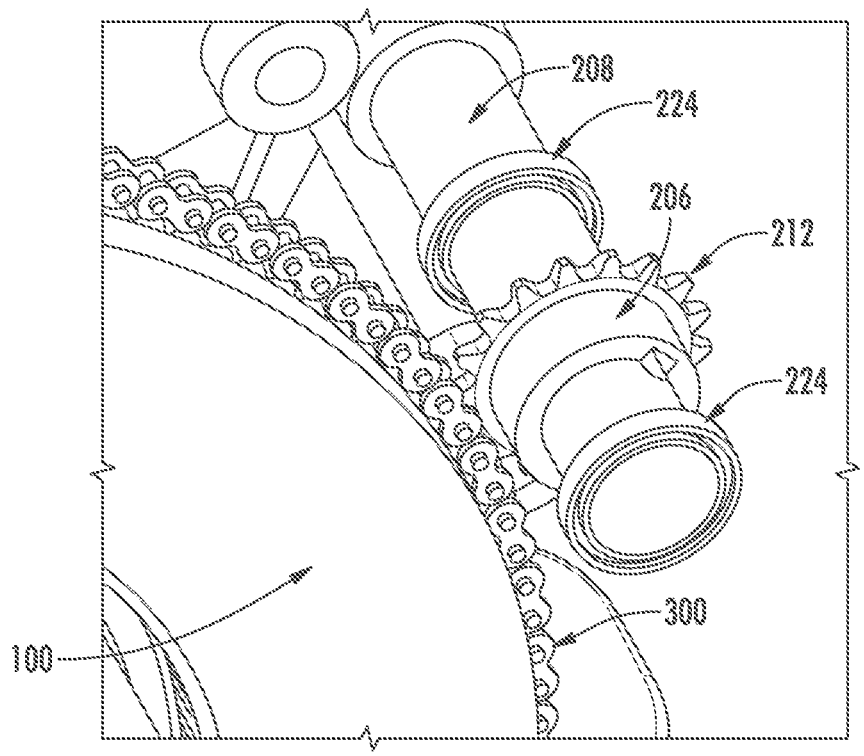
FIG. 36 is a partial perspective view of a coupler engaging a chain around the disc brake rotor, according to an exemplary embodiment of the invention.

FIGS. 11 to 20 show another embodiment of the present invention utilizing a chain 300 to transmit rotational energy from the disc brake rotor 100 to the coupler or sprocket 206. In this embodiment, the sprocket 206 is offset from the disc brake rotor 100. Referring to FIGS. 19-20, the ventilating slots 102 are formed by a plurality of spokes or elongated members 214 having tapered ends 216. The chain 300 extends around both a substantial portion of the circumference of the disc brake rotor 100, engaging the tapered ends 216 thereon, and a portion of the sprocket 206, thereby engaging the teeth 212 on the sprocket. Referring to FIG. 14, a clutch 230, as disclosed above, may be used to selectively control transmission of the energy to the generator 204.

In concluding the detailed description, it should be noted that it would be obvious to those skilled in the art that many variations and modifications can be made to the embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "suggested embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A system for the generation of energy in a vehicle having a disc brake, the disc brake having a disc having a plurality of ventilating slots circumferentially positioned thereon, the system comprising:
    a generator; and
    a coupler for mechanically connecting the generator to the ventilating slots of the disc.

2. The system of claim 1 wherein the generator comprises a connecting member that mechanically connects the generator to the coupler.

3. The system of claim 2 wherein the connecting member is an axle.

4. The system of claim 2 wherein the coupler comprises a coupler member having a plurality of teeth for engaging the ventilating slots.

5. The system of claim 2 which further comprises a bracket that maintains the coupler in position relative to the ventilating slots of the disc.

6. The system of claim 1 wherein the coupler comprises a coupler member having plurality of teeth for engaging the ventilating slots.

7. The system of claim 1 wherein the coupler comprises a chain disposed about at least a portion of a circumference of the disc and a coupler member having plurality of teeth for engaging the chain.

8. The system of claim 7 wherein the ventilating slots of the disc are defined by elongated members having tapered ends and wherein the chain engages the tapered ends of the elongated members.

9. The system of claim 1 which further comprises a bracket that maintains the coupler in position relative to the ventilating slots of the disc.

10. The system of claim 1 wherein the coupler comprises a chain.

11. The system of claim 1 which further comprises a clutch, the clutch selectively controlling the generation of energy by the generator.

12. The system of claim 1 which further an energy storage system electrically connected to the generator for storing energy generated by rotation of the disc.

13. A system for the generation of energy in a vehicle having a disc brake, the disc brake having a disc having a plurality of ventilating slots circumferentially positioned thereon, the system comprising:
 a generator;
 a coupler having a plurality of members for engaging the ventilating slots of the disc; and
 at least one connecting member mechanically coupling the generator to the coupler.

14. The system of claim 13 wherein the plurality of members are teeth.

15. The system of claim 13 which further comprises a bracket that maintains the coupler in position relative to the ventilating slots of the disc.

16. The system of claim 13 which further comprises a clutch, the clutch selectively controlling the generation of energy by the generator.

17. The system of claim 13 wherein the coupler comprises a chain disposed about at least a portion of a circumference of the disc and a coupler member having plurality of teeth for engaging the chain.

18. The system of claim 17 wherein the ventilating slots of the disc are defined by elongated members having tapered ends and wherein the chain engages the tapered ends of the elongated members.

19. The system of claim 13 which further comprises an energy storage system electrically connected to the generator for storing energy generated by the rotation of the disc.

* * * * *